US006952776B1

(12) United States Patent
    Chess (10) Patent No.: US 6,952,776 B1
(45) Date of Patent: Oct. 4, 2005

(54) METHOD AND APPARATUS FOR INCREASING VIRUS DETECTION SPEED USING A DATABASE

(75) Inventor: David M. Chess, Mohegan Lake, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/401,596

(22) Filed: Sep. 22, 1999

(51) Int. Cl.[7] .............................................. G06F 12/14
(52) U.S. Cl. .................... 713/188; 713/189; 707/103 R
(58) Field of Search ................................ 713/188, 200, 713/152, 201, 189; 707/1, 514, 103 R; 395/185.14, 395/186, 183.02, 183.15

(56) References Cited

U.S. PATENT DOCUMENTS

| | | | |
|---|---|---|---|
| 5,440,723 A | 8/1995 | Arnold et al. ............... 395/181 |
| 5,452,442 A | 9/1995 | Kephart .................. 395/183.14 |
| 5,473,769 A | 12/1995 | Cozza .................... 395/183.15 |
| 5,485,575 A | 1/1996 | Chess et al. ........... 395/183.14 |
| 5,572,590 A | 11/1996 | Chess ............................ 380/4 |
| 5,613,002 A | 3/1997 | Kephart et al. ................. 380/4 |
| 5,822,517 A | * | 10/1998 | Dotan ........................ 713/200 |
| 5,960,170 A | * | 9/1999 | Chen et al. ................... 714/38 |

OTHER PUBLICATIONS

Tesauro et al, Neural Networks for Computer Virus Recognition, Published in: IEEE Expert, vol. 11, No. 4, Aug. 1996 pp. 5-6.

* cited by examiner

Primary Examiner—Charles Rones
Assistant Examiner—Neveen Abel-Jalil
(74) Attorney, Agent, or Firm—Ohlandt, Greeley, Ruggiero & Perle, L.L.P.; Dwayne Nelson, Esq.

(57) ABSTRACT

A virus detection method for use in a computer system that contains at least one object that may potentially become infected with a computer virus. The method has steps of providing a database for storing information that is descriptive of a state of the object as it existed at a point in the past. For an object that is indicated as having a current state that is described by the stored information, another step programmatically examines the object for a presence of a computer virus while assuming that the current state of the object is the same as the state of the object as it existed at the point in the past. The the database stores additional information, beyond what is necessary to determine simply whether or not a particular object, such as a file, has changed. The additional information is employed to achieve a more rapid virus scan, even when the list of viruses being scanned for has changed since a previous scan.

37 Claims, 3 Drawing Sheets

METHOD AND APPARATUS FOR INCREASING VIRUS DETECTION SPEED USING A DATABASE

FIELD OF THE INVENTION

This invention is generally related to data processing systems and methods and, more particularly, to techniques for detecting the presence of undesirable software entities, such as computer software viruses, in data processing systems.

BACKGROUND OF THE INVENTION

One technique to protect a data processing system against computer viruses and other undesirable software entities is to periodically scan the potentially infectable objects (e.g., applications, files, etc.) on the system for the presence of known viruses, or new viruses that are sufficiently similar to known viruses to be detected using available algorithms. However, this process can be time-consuming, especially as the size of data processing systems and the number of known viruses increases.

More particularly, existing anti-virus software makes use of a large variety of algorithms to detect the presence of computer viruses and other undesirable software entities (hereinafter simply referred to as "viruses".) As the size of a typical system increases, and the number and complexity of known viruses and the objects that they infect increases, the time required to check a typical system for viruses also increases. Various techniques for speeding up these checks are known in the art. In general, most of these known techniques involve improved algorithms for deciding whether a given object contains a virus, independent of any information about the object other than its current contents.

It is known to employ techniques for increasing the speed of virus scanning by maintaining a database of information about the status of scanned objects, at the time the last scan was performed, and then using that database to determine which objects are new, or have changed in significant ways, since the last scan. Reference in this regard can be had to U.S. Pat. No. 5,473,769, "Method and Apparatus for Increasing the Speed of the Detecting of Computer Viruses", By Paul D. Cozza. Scanning only these objects can significantly reduce the time taken to perform the scan. However, this technique is not effective when one or more new viruses have been added to the set being scanned for. That is, since the new viruses were not scanned for the last time, the fact that an object has not changed since the last scan cannot be taken as indicating that the object need not be scanned this time. This is true since, if the object contains one of the newly-added viruses, the last scan would not have detected the new virus, but the current scan will. These known techniques, then, do not convey any advantage when the list of viruses being scanned for is updated between scans. As new computer viruses continue to appear more and more frequently, and network connectivity makes it feasible to update the virus list more and more often, the effectiveness of these known techniques can be expected to decline significantly.

A general reference to computer virus detection and removal techniques can be found in a publication coauthored by the inventor, "Fighting Computer Viruses", Scientific American, November 1997, J. O. Kephart et al., pp. 88–93. Reference may also be had to the following commonly assigned U.S. Patents for teaching various computer virus detection, removal and notification techniques: U.S. Pat. No. 5,440,723, issued Aug. 8, 1995, entitled "Automatic Immune System for Computers and Computer Networks", by Arnold et al.; U.S. Pat. No. 5,452,442, issued Sep. 19, 1995, entitled "Methods and Apparatus for Evaluating and Extracting Signatures of Computer Viruses and Other Undesirable Software Entities", by Kephart; U.S. Pat. No. 5,485,575, issued Jan. 16, 1996, entitled "Automatic Analysis of a Computer Virus Structure and Means of Attachment to its Hosts", by Chess et al.; U.S. Pat. No. 5,572,590, issued Nov. 5, 1996, entitled "Discrimination of Malicious Changes to Digital Information Using Multiple Signatures", by Chess; and U.S. Pat. No. 5,613,002, issued Mar. 18, 1997, entitled "Generic Disinfection of Programs Infected with a Computer Virus", by Kephart et al. The disclosures of these commonly assigned U.S. Patents are incorporated by reference herein in their entireties, in so far as the disclosures do not conflict with the teachings of this invention.

OBJECTS AND ADVANTAGES OF THE INVENTION

It is a first object and advantage of this invention to provide an improved technique to scan for the presence of viruses in a data processing system.

It is a second object and advantage of this invention to provide an improved technique to scan for the presence of virus-infected objects, wherein the improved technique requires less time than conventional techniques.

It is another object and advantage of this invention to provide a virus detection technique that uses a database to store additional information, beyond what is necessary to determine simply whether or not a particular object, such as a file, has changed, and to then employ this additional information to achieve a more rapid virus scan, even when the list of viruses being scanned for has changed since a previous scan.

SUMMARY OF THE INVENTION

The foregoing and other problems are overcome and the objects of the invention are realized by methods and apparatus in accordance with embodiments of this invention.

This invention provides a method and system for increasing the speed of object virus-scanning by storing intermediate results of one or more stages of the virus-scanning process in a database, and then using, in at least some cases, the stored information to avoid recalculating the same results.

The stored information may be used to determine, to a high probability, whether or not a current object has changed since it was last scanned, as well as further information that can be used in at least some cases to increase the speed of the virus detection operation. For example, the use of the stored information enables a virus-detecting program to avoid processing steps that would otherwise have to be carried out, or by using alternative faster processing steps that utilize the stored information.

Also stored on a computer storage device is a list of descriptions of known viruses and possibly also classes of known viruses, including for each virus or virus class a sufficient amount of information to allow the virus-detecting program to determine, for a given object, whether or not the object is significantly likely to be infected with that virus, or with a virus belonging to that class.

A virus detection method is disclosed for use in a computer system that contains at least one object that may potentially become infected with a computer virus. The method has steps of providing a database for storing information that is descriptive of a state of the at least one object as it existed at a point in the past and, for an object that is indicated as having a current state that is described by the stored information, a step of programmatically examining the object for a presence of a computer virus while assuming that the current state of the object is the same as the state of the object as it existed at the point in the past. This method, a computer program stored on a tangible medium that implements the method, and a system constructed and operated in accordance with the method, can significantly increase the speed of object virus-scanning.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
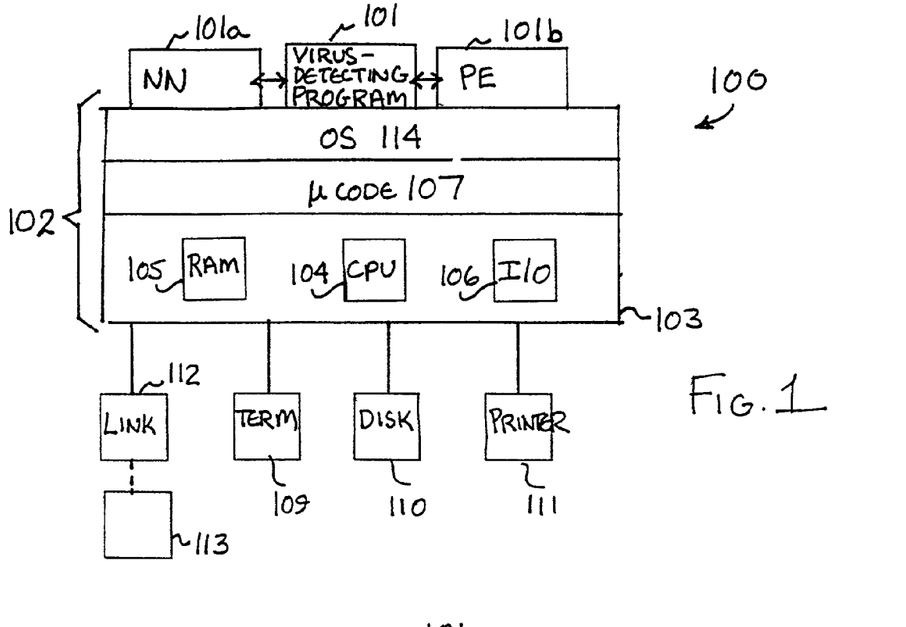
FIG. 1 is a simplified block diagram depicting an exemplary computer system on which a preferred embodiment of a virus-detecting program operates.

FIG. 1 is a block diagram showing an exemplary data processing or computer system 100 on which a preferred embodiment of the present invention operates. The computer system 100 includes a computer platform 102 having a hardware unit 103, and a virus-detecting program 101 that implements the methods depicted in FIGS. 3A and 3B. The virus-detecting program 101 operates on the computer platform 102 and hardware unit 103. The hardware unit 103 typically includes one or more central processing units (CPUs) 104, a random access memory (RAM) 105 and an input/output (I/O) interface 106. Microinstruction code 107, for example a reduced instruction set, may also be included on the platform 102. Various peripheral components may be connected to the computer platform 102. Typically provided peripheral components include a display 109, a data storage device (e.g. tape or disk) 110, and a printing device 111. A link 112 may also be included to connect the system 100 to one or more other similar computer systems shown simply as the block 113. The link 112 is used to transmit digital information between the computers 100 and 113. An operating system 114 coordinates the operation of the various components of the computer system 100, and is also responsible for managing the various objects or files, and for recording certain information regarding same, such as date and time last modified, file length, etc. An example of computer system 100 is the IBM IntelliStation™ (IntelliStation is a trademark of the IBM Corporation). It is expected that those skilled in the art will be familiar with many equivalent computer systems 100, and the teachings of this invention are not to be construed to be limited in any way to the specific architecture depicted in FIG. 1.

Figure 2:
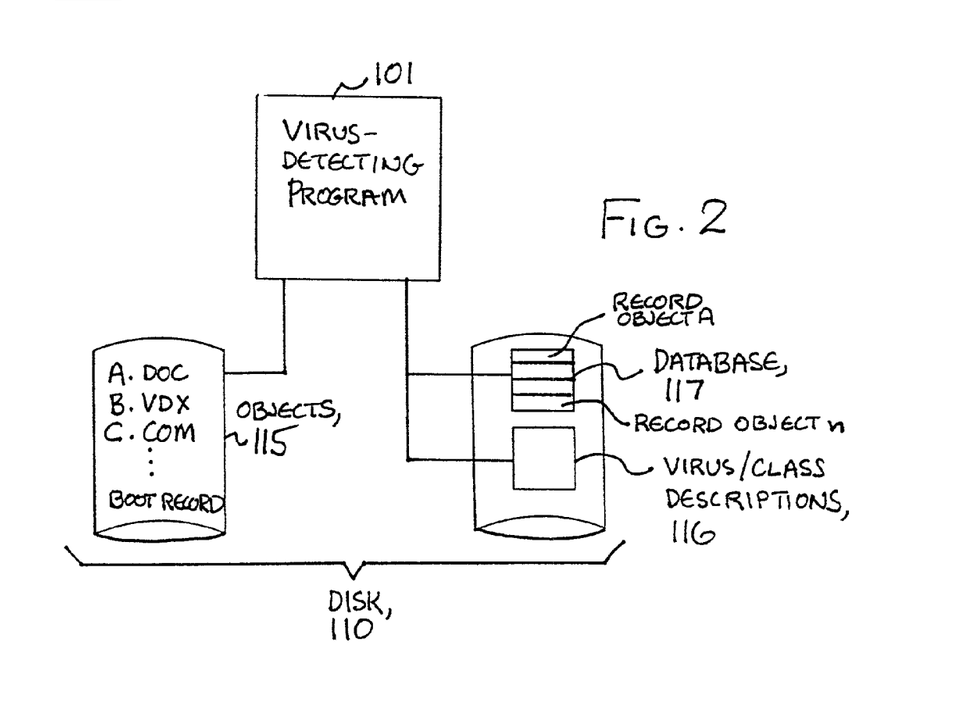
FIG. 2 is a block diagram that illustrates the logical connectivity between the virus-detecting program of FIG. 1, a storage unit for potentially infectable objects, and a database containing virus descriptions in accordance with an aspect of this invention.

Referring now as well to FIG. 2, in a presently preferred embodiment of this invention the virus-detecting program 101 has access to a collection of potentially-infectable objects 115, to a set of descriptions of known viruses and classes of viruses 116 and, in accordance with an aspect of this invention, to a database 117 containing information recorded during a previous execution of the virus-detecting program 101. The collection of potentially-infectable objects 115 can comprise, by way of example, documents, files and boot records that are stored on the disk 110, and which may also possibly be resident in the RAM 105.

Figure 3A:
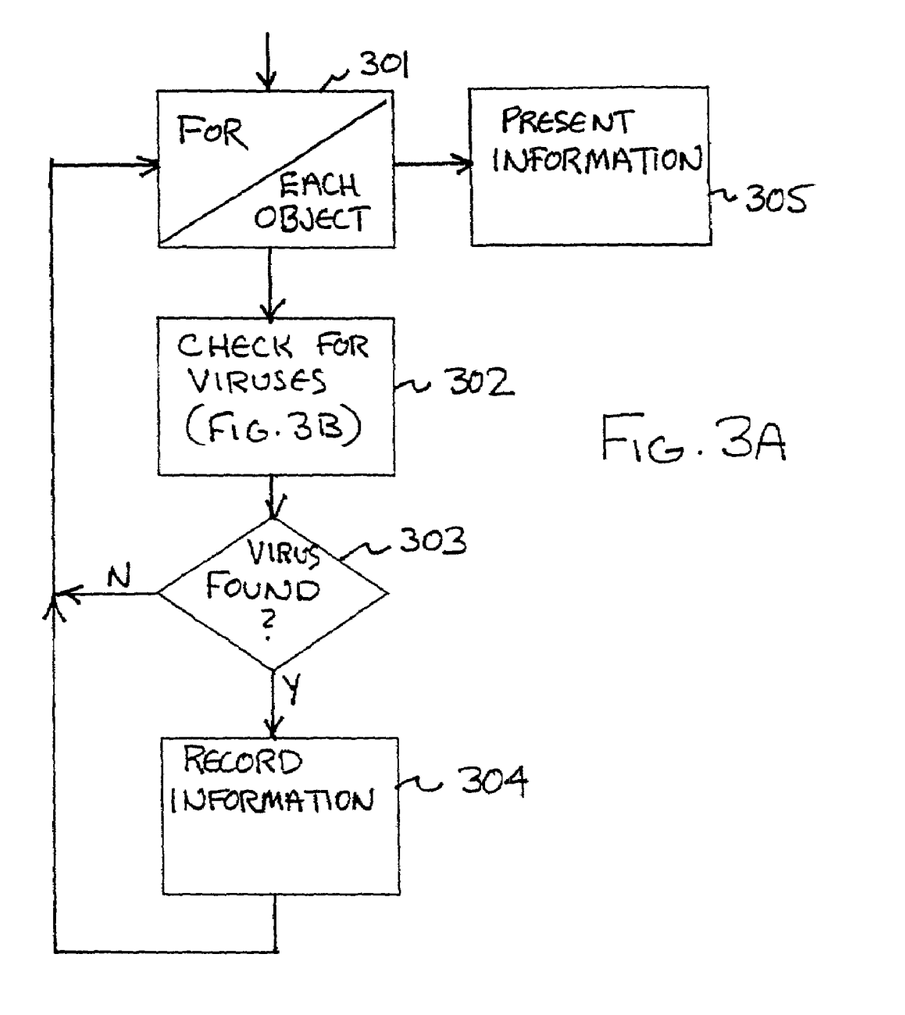
FIGS. 3A and 3B are logic flow diagrams depicting the operation of the virus detection system and method in accordance with an embodiment of this invention.

Referring to FIG. 3A, at Block 310 the virus-detecting program 101 treats in turn each of a subset of the members of the collection of potentially-infectable objects 115. At Block 302, each potentially-infectable object 115 is examined for viruses. If an object 115 is determined to be probably infected at Block 303, then the information as to the infection is recorded at Block 304. After all objects 115 have been inspected, the information recorded at Block 304 can be presented to the user at Block 305, or is otherwise employed. For example, in an alternative embodiment of this invention the information stored at Block 305 as to the infection of objects 115 is sent to a central server, and/or is used by an automatic clean-up process with little or no user intervention, and/or is sent to an administrator across the network link 112. This information can also be presented immediately to the user for action, without waiting for all remaining ones of the objects 115 to be examined first. A virus-detecting program 101 that operates in accordance with the teachings of this invention may also include various virus-removal and repair algorithms that are known in the art.

Figure 3B:
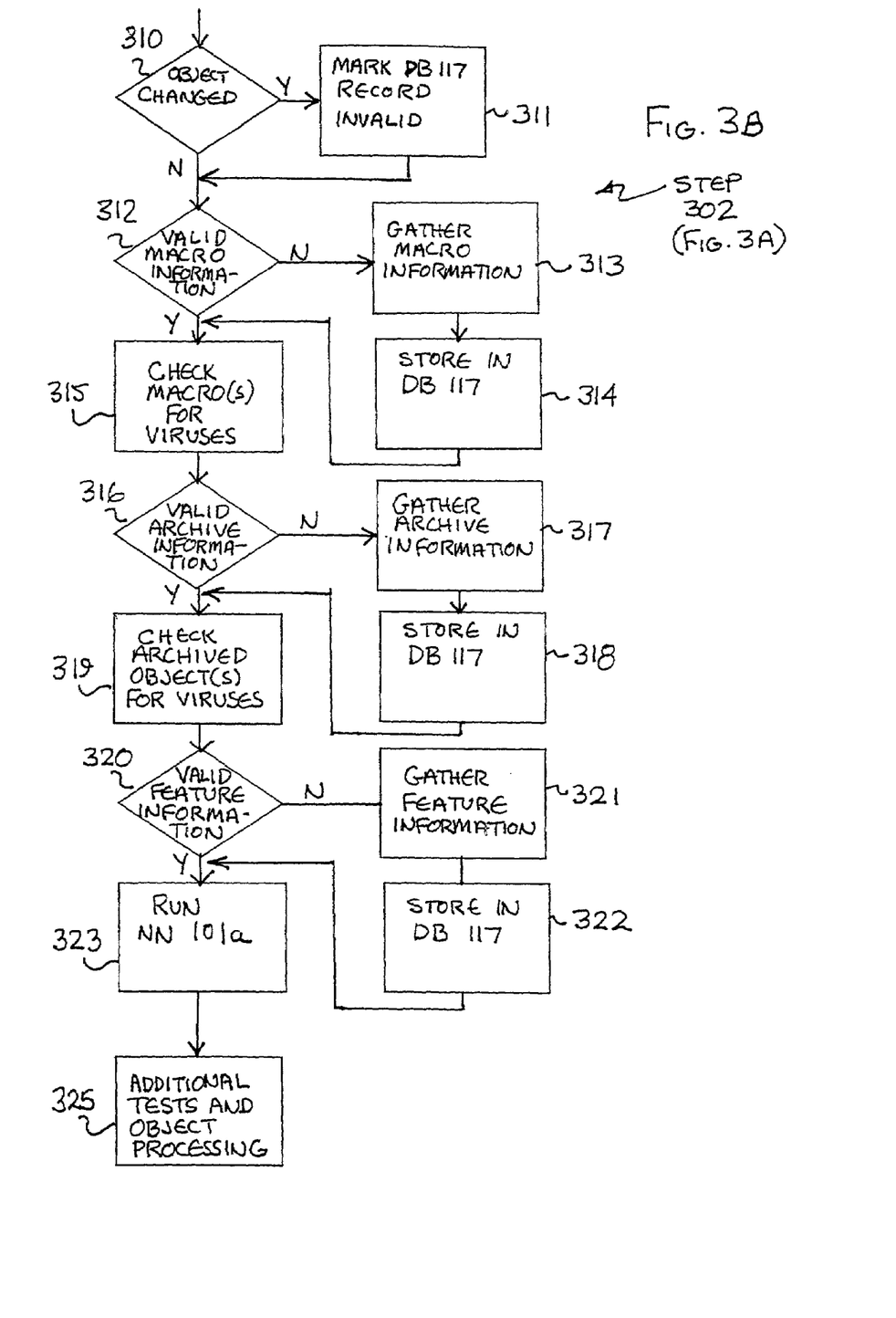

FIG. 3B illustrates the detailed operation of the virus-checking portion (Block 302) of the algorithm of FIG. 3A. Beginning with Block 310, for each object 115 being examined the virus-detecting program 101 first examines the object 115, and compares its current state to information recorded in the database 117 or elsewhere, such as in tables maintained by the operating system 114. If the object 115 is determined to have changed since the information was recorded in the database 117, the stored information for this object 115 is marked as invalid at Block 311. For example, the time and date of file creation or last modification may not agree with what is stored in the database 117, or the file length information may be different. If there is any indication that the object 115 may have been changed or altered since the last execution of the virus-detecting program 101, then the information in the database 117 is invalidated, such as by toggling a valid/invalid bit that is associated with the stored information in the database 117.

Next, at Block 312 the database information for the current object 115 (e.g., a document object) is examined to determine if it contains valid information concerning the number and location of macros (or other units of active content) in the object 115, where a macro is generally considered as a program or program-like object that is embedded within the object. If valid macro-related information is not found, control passes to Block 313 where the virus-detecting program 101 analyzes the object 115 to determine, for example, a number, location, size, name, extent, and/or other attributes of contained macros, if any, in the document object, and then stores that information in the database 117 at Block 314. The location can be indicated, for example, as a byte count from a reference point in the object, such as a number of bytes from the beginning of a file. Next, at Block 315 the virus-detecting program 101 locates the macros contained in the object 115, if any, using information from the database 117, and tests the macro(s) for viruses using the virus descriptions 116 and a suitable virus-detection method.

Reference in this regard may be had to commonly assigned U.S. patent application Ser. No. 09/041,493, filed Mar. 12, 1998, entitled "Automated Sample Creation of Polymorphic and Non-Polymorphic Macro Viruses", by Jean-Michel Y. Boulay, August T. Petrillo and Morton G. Swimmer, the disclosure of which is incorporated by reference herein in its entirety.

Next, at Block 316 the database information 117 for the current object 115 is examined to determine if it contains valid information concerning the presence and location of any archived objects (for example, ZIPped or ARJed files) that are stored as components within the current object. If the database 117 does not contain valid information regarding archived objects, at Block 317 the virus-detecting program 101 analyzes the object 115 to determine the presence, number and location of any archived objects, and stores this information into the database at Block 318. Again, the location of archived objects may be indicated as a byte count from the beginning of the object 115. Next, at Block 319 the archived objects, if any, which are potentially infected are located using the information found in the database 117 and are examined for the presence of viruses using the virus descriptions 116 and any suitable method known in the art.

Further in this regard, for at least some objects 115 that contain in an archived or combined form one or more other objects, the method may store information as to whether any of the contained objects are of a type that are required to be scanned for viruses. The virus-detecting program 101 is responsive to this stored information in the database 117 to not re-determine and re-scan the contained objects if the information in the database 117 indicates that none of them need to be scanned.

Also for those objects 115 that contain in an archived or combined form one or more other objects, the method may store information as to, for example, the location, extent, and/or encoding-method of contained objects which should be scanned for computer viruses. In this case the virus-detecting program 101 is responsive to the stored information for reducing the amount of processing time that is required to extract the contained objects in order to scan them.

Continuing now at Block 320, the database 117 entry for the current object 115 is examined to determine if it contains valid information concerning those features of the object 115 that may serve as input to a neural-network component of the virus-detecting program 101 (assuming that one is present). Such features can include, by example, the file length, the frequency of distribution of all or certain op-codes, and whether certain instructions or instruction types are found in macros. General reference with regard to a neural network-based virus detection scheme can be found in a publication entitled "Neural Networks for Computer Virus Recognition", by G. Tasauro et al., IEEE Expert Magazine, Vol. 11, no. 4, 8/96, pp. 5–6. If the feature information is not located in the database 117, control passes to Block 321 where the current object 115 is analyzed to determine which features are present, and the feature information is then added to the database 117 at Block 322. The neural network virus detector 101*a* is then run at Block 323, using the feature information that was previously added to, or just added to, the database 117, to determine the possible presence of viruses in the object 115.

Further in this regard, the virus detecting program 101 includes or is coupled to the neural network (NN) unit component 101*a* that employs features from an object 115 to be examined, evaluates those features using weights and connections, and outputs an indication of whether the object 115 may contain a virus. In this case, and for at least one of the objects 115, the method stores at least a subset of object-related features that are relevant to the inputs of the neural network component 101*a*, and the neural network component 101*a* then uses the stored subset of features, rather than re-extracting these features from the object 115 itself, if the database 117 indicates that the object 115 has not changed since the features were previously extracted, and if the set of features used during the current scan by the virus-detecting program contains at least one of the features previously stored.

It should be appreciated that by making use of the information stored in the database 117, the potentially time-consuming steps of analyzing the objects for macros, archived components, and neural-network input features may be avoided, resulting in a significant increase in performance. For example, and referring again to FIG. 3B, it can be appreciated that if the database 117 is found to contain valid information for a particular object 115, then Blocks 312, 315, 316, 319, 320 and 323 can be executed in succession, thereby avoiding the time-consuming object processing involved in the blocks 313, 317 and 321.

In alternative embodiments of this invention, other types of stored information can be employed in the same way. For example, in one alternative embodiment the database 117 is used to record only whether a particular object 115 contains any macros, but not to record the location or other information regarding the macros. In this case the overall speed advantage is less, since if an object is specified as containing a macro then the location(s) must still be determined. However, an advantage that is gained is that the size of the database 117 can be reduced. In another embodiment, the database 117 is used to record only whether or not each object 115 contains any potentially-infectable archived components, but not to record their location or other information. Again, the speed advantage is reduced, but the size of the database 117 is also reduced.

In further embodiments of this invention, still other types of information stored within the database 117 can be employed in the manner described thus far. The additional test and object processing step(s) are depicted generally in FIG. 3B as the Block 325. Several examples of these tests and object processing are now provided. These examples are not intended to be read in a limiting sense upon the practice of this invention.

For example, in a further alternative embodiment the database is used to record whether or not each object can possibly be infected with a virus of any kind, according to certain criteria, and during execution of the virus-detecting program 101 any object 115 for which there is a valid record in the database 117 indicating that it cannot possibly be infected according to those criteria, and the criteria are the same as, or more stringent than, the criteria in effect for this particular run of the virus-detecting program 101, then the object 115 is not checked for viruses.

In a further embodiment of this invention the information stored in the database 117 is descriptive of the location of an entry-point of the object 115, In this case the virus-detecting program 101 uses the stored information, rather than re-reading the object 115 to determine the entry-point, so long as the database 117 indicates that the object 115 has not changed since the entry-point information was last recorded.

In a further embodiment of this invention the information stored in the database 117 is descriptive of the location, size, and/or attributes of segments or other units of program-structure contained in the object 115. In this case the virus-detecting program 101 uses the stored information, rather than re-reading the object 115 to determine these aspects of its structure, so long as the database 117 indicates that the object 115 has not changed since the program structure information was last recorded. It is also within the scope of the teachings of this invention to programmatically examine a current object by performing a program-emulation step that executes the current object in a virtual environment, and that collects or accumulates data resulting from the execution in the virtual environment. This data can include, by example, the contents of decrypted buffers and/or certain system calls issued by the object. In this case the virus-detecting program 101 includes or is coupled to program-emulation (PE) unit or component 101b, and stores at least some of the results data produced by the program-emulation unit, and then uses the stored information, and inhibits operation of the program-emulation unit 101b, if the database 117 indicates that the object 115 has not changed since the information was recorded.

Reference with regard to execution of an object or a portion of an object in a virtual environment may be had to commonly assigned U.S. patent application Ser. No. 09/160,117, filed Sep. 24, 1998, entitled "Interpreter with Virtualized Interface", by David M. Chess, the disclosure of which is incorporated by reference herein in its entirety.

Based on the foregoing description it should be apparent that an aspect of this invention is a computer program that is embodied on a computer-readable medium, such as the disk 110, for providing a virus detection program subsystem. The computer program has a capability to create or at least maintain the database 117 for storing information that is descriptive of a state of at least one object 115 as it existed at a point in the past, and an object examination code segment 101 that is responsive to a determination that an object 115 has a current state that is described by the stored information in the database 117, for programmatically examining the object 115 for a presence of a computer virus, while using the stored information from the database 117. The computer readable medium further stores a list 116 comprised of information that is descriptive of at least one of known viruses and of known classes of viruses. The list 116 is used by the object examination code segment 101 when programmatically examining the object 115 for the presence of a computer virus. The computer readable medium may further store the neural network-based virus detection code segment 101a. In this case the database 117 stores further information that is descriptive of features of the object 115 that serve as inputs to the neural network-based virus detection code segment 101a. The computer readable medium may further store a program-emulation code segment 101b for executing objects 115 in a virtual environment, for collecting data resulting from the execution in the virtual environment, and for storing at least some of the results in the database 117. In this case the object examination unit code segment 101 is responsive to the stored results for using the stored results, and for inhibiting the operation of the program emulation unit code segment 101b if said database indicates that the object 115 has not changed since the results were stored.

In a further aspect of these teachings the computer program is capable of executing a method for use in the computer system that includes the at least one potentially infectable object, where the method executed by the computer program has steps of, (a) maintaining a database comprised of the stored information descriptive of a state of the at least one object as it existed at a point in the past, and, for an object that the database indicates has a current state that is described by the stored information, programmatically examining the object for a presence of a computer virus while assuming that the current state of the object is the same as the state of the object as it existed at the point in the past.

It should be realized that the teachings of this invention are not intended to be limited to only the hardware and software architectures described above, nor to the storage in the database 117 of only the specific information that was described above. In general, the database 117 can be used to store any object-related information that can be used to facilitate the operation of the virus-detecting program or code segment 101. It should also be noted that certain steps of the method shown in FIG. 3 could be executed in other than the order shown (e.g., Blocks 312 and 315 could be interchanged with Blocks 316 and 319), other steps could be added, and other steps may be deleted. For example, if the neural network unit 101a is not present, then the execution of Blocks 320 through 323 is not required.

Thus, while the invention has been particularly shown and described with respect to preferred embodiments thereof, it will be understood by those skilled in the art that changes in form and details may be made therein without departing from the scope and spirit of the invention.

What is claimed is:

1. A computer program embodied on a computer-readable medium for providing a virus detection program subsystem, comprising:
   a code segment that at least maintains an object-state database comprised of stored object information that is descriptive of a state of at least one object that is subject to infection by a computer virus and that reflects the state of said object as it existed at a point in the past;
   a virus detecting code segment that at least maintains a virus-detection database comprised of virus-detection information used in programmatically examining objects for the presence of various computer viruses; and
   an examination code segment, which, for a current scan of said object that is indicated as having a current state that is described by the stored object information, determines whether or not said object appears to have changed since said point in the past; and which, in the case that said object does not appear to have changed since said point in the past, but said virus-detection database does appear to have changed since said point in the past, programmatically examines said object for a presence of a computer virus while making use of the stored object information during the examination.

2. A computer program as in claim 1, wherein said computer readable medium further stores a list comprised of information that is descriptive of at least one of known viruses and of known classes of viruses, said list being used by said object examination code segment when programmatically examining the object for the presence of a computer virus.

3. A computer program as in claim 1, wherein said computer readable medium further stores a neural network-based virus detection code segment, wherein said object-state database further stores information descriptive of features of the object that serve as inputs to said neural network based virus detection code segment, and wherein said neural network-based virus detection code segment uses the features as inputs.

4. A computer program as in claim 1, wherein said computer readable medium further stores a program-emulation code segment for executing objects in a virtual environment, for collecting data resulting from the execution in the virtual environment, and for storing at least some of the results in said database, and wherein said object examination unit code segment is responsive to the stored results for using said stored results, and for inhibiting the operation of said program emulation unit code segment, if said o sect-state database indicates that the object has not changed since the results were stored.

5. A computer program embodied on a computer-readable medium, the computer program being capable of executing a method for use in a computer system that comprises at least one object that is subject to infection with a computer virus, the method executed by the computer program comprising steps of:

maintaining an object-state database comprised of stored object information that is descriptive of a state of at least one object that is subject to infection by a computer virus and that reflects the state of said object as it existed at a point in the past;

maintaining a virus-detection database comprised of virus-detection information used in programmatically examining objects for the presence of various computer viruses;

for a current scan of said object that is indicated as having a current state that is described by the stored object information, determining whether or not said object appears to have changed since said point in the past; and in the case that said object does not appear to have changed since said point in the past, but said virus-detection database does appear to have changed since said point in the past, programmatically examining said object for a presence of a computer virus while making use of the stored object information during the examination.

6. A computer program as in claim 5, wherein the stored object information is descriptive at least in part of a number and location of macros within the object.

7. A computer program as in claim 5, wherein the stored oJect information is descriptive at least in part of a number and location of archived objects within the object.

8. A computer program as in claim 5, wherein the computer program implements or has access to a neural network-based virus detection system, wherein the stored object information is descriptive at least in part of features of the object that serve as inputs to the neural network-based virus detection system, and wherein the step of programmatically examining the object comprises a step of operating the neural network-based virus detection system using the features as inputs.

9. A computer program as in claim 5, wherein for an object that the object-state database indicates has a current state that is not described by the stored object information, the step of programmatically examining comprises an initial step of operating the stored program to process the object to ascertain the current state of the object, and storing information in the object-state database that is descriptive of the current state of the object.

10. A virus detection method for use in a computer system, comprising steps of providing an object-state database comprised of stored object information that is descriptive of a state of at least one object that is subject to infection by a computer virus and that reflects the state on object as it existed at a point in the past;

providing a virus-detection database comprised of virus-detection information used in programmatically examining objects for the presence of various computer viruses;

for a current scan of said object that is indicated as having a current state that is described by the stored object information, determining whether or not said object appears to have changed since said point in the past; and in the case that said object does not appear to have changed since said point in the past, but said virus-detection database does appear to have changed since said point in the past, programmatically examining said object for a presence of a computer virus while making use of the stored object information during the examination.

11. A method as in claim 10, wherein the stored object information is descriptive at least in part of a number and location of macros within the object.

12. A method as in claim 10, wherein the stored object information is descriptive at least in part of a number and location of archived objects within the object.

13. A method as in claim 10, wherein the stored object information is descriptive at least in part of features of the object that serve as inputs to a neural network-based virus detection system, and wherein the step of programmatically examining the object comprises a step of operating the neural network-based virus detection system using the features as inputs.

14. A method as in claim 10, wherein the stored object information is descriptive at least in part of whether at least one macro is present within the object.

15. A method as in claim 10, wherein the stored object information is descriptive at least in part of whether at least one archived object is present within the object.

16. A method as in claim 10, wherein the stored 2ob information is descriptive at least in part of whether the object can possibly be infected with a virus according to predetermined criteria, and wherein the step of programmatically examining is executed only if the stored object information indicates that the object may possibly be infected according to the predetermined criteria as compared to criteria that are currently in effect.

17. A method as in claim 10, wherein if it is indicated that a current state of the object is not described by the stored object information, the step of programmatically examining comprises an initial step of processing the object to ascertain the current state of the object, and storing information in the object-state database that is descriptive of the current state of the object.

18. A method as in claim 10, wherein the stored object information comprises, for an object that contains in archived or combined form at least one other object, information descriptive of whether the at least one contained object is of a type that should be examined for computer viruses, and wherein the step of programmatically examining avoids re-determining and re-scanning the contained at least one object if the stored object information indicates that the at least one contained object is not required to be scanned.

19. A method as in claim 10, wherein the stored object information comprises, for an object that contains in archived or combined form at least one other object, information descriptive of at least one of a location, extent, or encoding-method of the at least one contained object, and wherein the step of programmatically examining is responsive to the stored object information for reducing an amount of processing time required to extract the at least one contained object in order to examine the at least one contained object.

20. A method as in claim 10, wherein the stored object information comprises information descriptive of a location of an entry-point of the object, and wherein the step of programmatically examining uses the stored object information to determine the entry-point of the object, if the object-state database indicates that the object has not changed since the entry-point information was stored.

21. A method as in claim 10, wherein the stored object information comprises information descriptive of a structure of the object, and wherein the step of programmatically examining uses the stored object information to determine the structure of the object, if the object-state database indicates that the object has not changed since the structure information was stored.

22. A method as in claim 10, wherein the stored object information comprises information descriptive of at least one of a number, size, name, extent, or other attribute of macros or other units of active content in the object, and wherein the step of programmatically examining uses the stored object information to determine at least one of the number, size, name, extent, or other attribute of macros or other units of active content in the object, if the object-state database indicates that the object has not changed since the information was stored.

23. A method as in claim 10, wherein the step of programmatically examining includes a program-emulation step for executing the current object in a virtual environment, for collecting data resulting from the execution in the virtual environment, and for storing at least some of the results produced by the program-emulation step in the object-state database, and wherein the step of programmatically examining uses the stored results rather than re-executing the program-emulation step, if the object-state database indicates that the object has not changed since the results were stored.

24. A virus detection component for use in a computer system, comprising:
an object-state database comprised of stored object information that is descriptive of a state of at least one object that is subject to infection by a computer virus and that reflects the state of said object as it existed at a point in the past;
a virus-detection database comprised of virus-detection information used in programmatically examining objects for the presence of various computer viruses; and
an object examination unit, which, for a current scan of said object that is indicated as having a current state that is described by the stored object information, determines whether or not said object appears to have changed since said point in the past; and which, in the case that said object does not appear to have changed since said point in the past, but said virus-detection database does appear to have changed since said point in the past, programmatically examines said object for a presence of a computer virus while making use of the stored object information during the examination.

25. A virus detection component as in claim 24, wherein the stored object information is descriptive at least in part of a number and location of macros within the object.

26. A virus detection component as in claim 24, wherein the stored object information is descriptive at least in part of a number and location of archived objects within the object.

27. A virus detection component as in claim 24, wherein the stored object information is descriptive at least in part of features of the object that serve as inputs to a neural network-based virus detection system, and wherein said neural network-based virus detection system uses the features as inputs.

28. A virus detection component as in claim 24, wherein the stored object information is descriptive at least in part of whether at least one macro is present within the object.

29. A virus detection component as in claim 24, wherein the stored object information is descriptive at least in part of whether at least one archived object is present within the object.

30. A virus detection component as in claim 24, wherein the stored object information is descriptive at least in part of whether the object can possibly be infected with a virus according to predetermined criteria, and wherein said object examination unit programmatically examines said object only if the stored object information indicates that the object may possibly be infected according to the predetermined criteria as compared to criteria that are currently in effect.

31. A virus detection component as in claim 24, wherein if said determination indicates that a current state of the object is not described by the information stored in said database, said object examination unit first processes the object to ascertain the current state of the object, and stores information in said object-state database that is descriptive of the current state of the object.

32. A virus detection component as in claim 24, wherein the stored object information comprises, for an object that contains in archived or combined form at least one other object, information descriptive of whether the at least one contained object is of a type that should be examined for computer viruses, and wherein said object examination unit inhibits re-determining and re-scanning the contained at least one object if the stored object information indicates that the at least one contained object is not required to be scanned.

33. A virus detection component as in claim 24, wherein the stored object information comprises, for an object that contains in archived or combined form at least one other object, information descriptive of at least one of a location, extent, or encoding-method of the at least one contained object, and wherein said object examination unit is responsive to the stored object information for reducing an amount of processing time required to extract the at least one contained object in order to examine the at least one contained object.

34. A virus detection component as in claim 24, wherein the stored object information comprises information descriptive of a location of an entry-point of the object, and wherein said object examination unit is responsive to the stored object information to determine the entry-point of the object, if the object-state database indicates that the object has not changed since the entry-point information was stored.

35. A virus detection component as in claim 24, wherein the stored object information comprises information descriptive of a structure of the object, and wherein said object examination unit is responsive to the stored object information for determining the structure of the object, if the object-state database indicates that the object has not changed since the structure information was stored.

36. A virus detection component as in claim 24, wherein the stored object information comprises information descriptive of at least one of a number, size, name, extent, or other attribute of macros or other units of active content in the object, and wherein said object examination unit is responsive to the stored object information for determining at least one of the number, size, name, extent, or other attribute of macros or other units of active content in the object, if the object-state database indicates that the object has not changed since the information was stored.

37. A virus detection component as in claim 24, and further comprising a program-emulation unit for executing the current object in a virtual environment, for collecting data resulting from the execution in the virtual environment, and for storing at least some of the results produced by the program-emulation unit in said database, and wherein said object examination unit is responsive to the stored results for using said stored results, and for inhibiting the operation of said program emulation unit, if the object-state database indicates that the object has not changed since the results were stored.

* * * * *